(12) United States Patent
Kishyama et al.

(10) Patent No.: US 8,472,385 B2
(45) Date of Patent: Jun. 25, 2013

(54) BASE STATION, MOBILE STATION AND COMMON INFORMATION COMMUNICATING METHOD

(75) Inventors: Yoshihisa Kishyama, Yokosuka (JP); Motohiro Tanno, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 284 days.

(21) Appl. No.: 12/989,603

(22) PCT Filed: Apr. 22, 2009

(86) PCT No.: PCT/JP2009/058025
§ 371 (c)(1),
(2), (4) Date: Jan. 11, 2011

(87) PCT Pub. No.: WO2009/133802
PCT Pub. Date: Nov. 5, 2009

(65) Prior Publication Data
US 2011/0110320 A1 May 12, 2011

(30) Foreign Application Priority Data
Apr. 28, 2008 (JP) ................................. 2008-117878

(51) Int. Cl.
*H04W 4/00* (2009.01)
*H04W 72/00* (2009.01)
*H04B 7/208* (2006.01)
*H04L 12/28* (2006.01)
*H04J 3/16* (2006.01)
*H04W 84/04* (2009.01)
*H04L 5/00* (2006.01)
H04L 29/02 (2006.01)
H04W 72/04 (2009.01)

(52) U.S. Cl.
CPC ............. *H04W 84/04* (2013.01); *H04L 5/0007* (2013.01); *H04W 72/005* (2013.01); H04L 29/02 (2013.01); H04W 72/04 (2013.01)
USPC ........... 370/328; 370/344; 370/432; 370/465; 455/450

(58) Field of Classification Search
USPC ................. 370/328, 329, 343, 344, 431, 432, 370/464–466; 455/450–453
See application file for complete search history.

(56) References Cited

U.S. PATENT DOCUMENTS 8,102,896 B2 * 1/2012 Pajukoski et al. ............. 375/146
2009/0190539 A1 7/2009 Tanno et al.
(Continued)

FOREIGN PATENT DOCUMENTS

JP 2007-194868 A 8/2007
(Continued)

OTHER PUBLICATIONS

Machine Translation of JP 2007-336493.*
(Continued)

*Primary Examiner* — Paul H Masur
(74) *Attorney, Agent, or Firm* — Osha • Liang LLP

(57) ABSTRACT

A base station, for transmitting common information and control information, includes a common information generating unit that generates the control information and the common information, a lower-layer control information generating unit that generates first lower-layer control information indicating a radio resource where the control information is to be placed and second lower-layer control information indicating a radio resource where the common information is to be placed. The base station also includes a multiplexing unit that multiplexes the first lower-layer control information and the control information and multiplexes the second lower-layer control information and the common information, the system bandwidth being divided into a plurality of frequency blocks each corresponding to a minimum value of maximum transmission and reception bandwidths used by the plural mobile stations, and a transmitting unit that transmits the multiplexed first lower-layer control information, control information, second lower-layer control information, and common information.

9 Claims, 15 Drawing Sheets

U.S. PATENT DOCUMENTS

2010/0075684 A1 3/2010 Iwamura et al.
2010/0316093 A1* 12/2010 Ko et al. .................. 375/147

FOREIGN PATENT DOCUMENTS

| JP | 2007336493 A | * | 12/2007 |
| WO | 2007/148585 A1 | | 12/2007 |
| WO | 2008/123071 A1 | | 10/2008 |

OTHER PUBLICATIONS

Patent Abstracts of Japan, Publication No. 2007-194868, dated Aug. 2, 2007, 1 page.

NTT Domoco Inc., Update Views on Support of Wider Bandwidth in LTE-Advanced, [online]. 3GPP TSG RAN WG1 Meeting #54, R1-083015, Aug. 18, 2008, [retrieved on Jul. 7, 2009]. Retrieved from the Internet<URL:http://www.3gpp.org/ftp/tsg_ran/WG1_RL1/TSGR1_54/Docs/R1-083015.zip>, 19 pages.

Panasonic, Discussion of the LTE-Advanced only band, [online]. 3GPP TSG RAN WG1 Meeting #54, R1-083000, Aug. 18, 2008, [retrieved on Jul. 7, 2009]. Retrieved from the Internet<URL:http://www.3gpp.org/ftp/tsg_ran/WG1_RL1/TSGR1_54/Docs/R1-083000.zip>, 2 pages.

ZTE, General control channel design for LTE-A [online]. 3GPP TSG-RAN WG1 #54, R1-082848, Aug. 18, 2008, [retrieved on Jul. 7, 2009]. Retrieved from the Internet<URL:http://www.3gpp.org/ftp/tsg_ran/WG1_RL1/TSGR1_54/Docs/R1-082848.zip>, 3 pages.

3GPP TS 36.306 V8.1.0, Mar. 2008, "Evolved Universal Terrestrial Radio Access (E-UTRA) User Equipment (UE) radio access capabilities," 13 pages.

International Search Report issued in PCT/JP2009/058025, mailed on Jul. 21, 2009, with translation, 9 pages.

Written Opinion issued in PCT/JP2009/058025, mailed on Jul. 21, 2009, 3 pages.

* cited by examiner

BASE STATION, MOBILE STATION AND COMMON INFORMATION COMMUNICATING METHOD

CROSS-REFERENCE TO RELATED APPLICATIONS

The present patent application is a national stage application of PCT Application No. PCTJP2009058025 filed on Apr. 22, 2009 which claims priority from Japanese Patent Application No. 2008-117878 filed on Apr. 28, 2008, the entire contents of which are incorporated herein by reference.

TECHNICAL FIELD

The present invention relates to a base station, a mobile station, and a common information communicating method.

BACKGROUND ART

In 3GPP (3rd Generation Partnership Project), radio interfaces for E-UTRA (Evolved UMTS Terrestrial Radio Access) or LTE (Long Term Evolution) are standardized. The system bandwidth defined for E-UTRA is 1.4 MHz at the minimum and 20 MHz at the maximum, the maximum downlink data rate is 300 Mbps, and the maximum uplink data rate is 75 Mbps (see 3GPP TS36.306 (v8.1.0)).

Depending on the maximum system bandwidth of 20 MHz for E-UTRA, the maximum transmission and reception bandwidth of a mobile station for E-UTRA is 20 MHz. As shown in FIG. 1, the mobile station can transmit and receive with the bandwidth of 5 MHz when the system bandwidth is 5 MHz, and the mobile station can transmit and receive with the bandwidth of 20 MHz when the system bandwidth is 20 MHz, for example.

DISCLOSURE OF INVENTION

Problem(s) to be Solved by the Invention

In a future radio access system such as IMT-Advanced (also referred to as LTE-Advanced in 3GPP), a higher data rate (for example, the maximum downlink data rate of 1 Gbps) is required.

Depending on such a higher data rate, a wider system bandwidth (for example, the maximum system bandwidth of 100 MHz) is required.

On the other hand, in order to achieve orderly (smooth) transition from the existing system such as E-UTRA (or LTE) to the future radio access system, full support of the existing terminals such as E-UTRA terminals (or LTE terminals) is required.

In order to satisfy these requirements, the future radio access system needs to support UE (User Equipment) capabilities of plural maximum transmission and reception bandwidths. For example, as shown in FIG. 2, the future radio access system needs to support both the mobile station which can transmit and receive with the bandwidth of 100 MHz (or a portion thereof) and the mobile station which can transmit and receive with the bandwidth of 20 MHz.

Provided that E-UTRA terminals are fully supported in IMT-Advanced, it is assumed that the minimum value of the maximum transmission and reception bandwidths is 20 MHz. Accordingly, it is required that both terminals (E-UTRA terminals) which can transmit and receive data with the maximum bandwidth of 20 MHz at most and terminals (IMT-A terminals or IMT-Advanced terminals) which can transmit and receive data with the transmission and reception bandwidth of 20 MHz or more be supported in IMT-Advanced.

It is a general object of the present invention to support both existing terminals such as E-UTRA terminals and new terminals such as IMT-A terminals, and to efficiently allocate bands to these terminals.

Means for Solving the Problem(s)

In one aspect of the present invention, there is provided a base station for transmitting both common information which is used in common by plural mobile stations and control information indicating that the common information is changed, including:

a common information generating unit configured to generate the control information and the common information;

a lower-layer control information generating unit configured to generate first lower-layer control information indicating a radio resource where the control information is to be placed and second lower-layer control information indicating a radio resource where the common information is to be placed;

a multiplexing unit configured to multiplex the first lower-layer control information and the control information into a plurality of frequency blocks included within a system bandwidth and multiplex the second lower-layer control information and the common information into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations; and a transmitting unit configured to transmit the multiplexed first lower-layer control information, control information, second lower-layer control information, and common information.

In another aspect of the present invention, there is provided a mobile station for receiving from a base station both common information which is used in common by plural mobile stations and control information indicating that the common information is changed, including:

a lower-layer control information receiving unit configured to receive first lower-layer control information which is multiplexed into a plurality of frequency blocks included within a system bandwidth and second lower-layer control information which is multiplexed into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations; and a common information receiving unit configured to receive the control information based on the first lower-layer control information and receive the common information based on the control information and the second lower-layer control information.

In another aspect of the present invention, there is provided a mobile station for receiving from a base station both common information which is used in common by plural mobile stations and control information indicating that the common information is changed, including:

a lower-layer control information receiving unit configured to receive lower-layer control information;

a control information receiving unit configured to receive the control information based on the lower-layer control information;

a radio resource control unit configured to change a radio resource to receive the common information based on the lower-layer control information and the control information; and a common information receiving unit configured to receive the common information with the changed radio resource.

In another aspect of the present invention, there is provided a common information communicating method for transmitting from a base station to a mobile station both common information which is used in common by plural mobile stations and control information indicating that the common information is changed, including the steps of:

generating, by the base station, the control information and the common information;

generating, by the base station, first lower-layer control information indicating a radio resource where the control information is to be placed and second lower-layer control information indicating a radio resource where the common information is to be placed;

multiplexing, by the base station, the first lower-layer control information and the control information into a plurality of frequency blocks included within a system bandwidth and multiplex the second lower-layer control information and the common information into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations;

transmitting, by the base station, the multiplexed first lower-layer control information, control information, second lower-layer control information, and common information;

receiving, by the mobile station, the first lower-layer control information;

receiving, by the mobile station, the control information based on the first lower-layer control information; and receiving, by the mobile station, the common information based on the second lower-layer control information and the control information.

Advantageous Effect of the Invention

According to an embodiment of the present invention, it is possible to efficiently allocate bands to these terminals.

DETAILED DESCRIPTION OF THE PREFERRED EMBODIMENTS

With reference to the accompanying drawings, embodiments of the present invention are described below.

In the following embodiments, how to efficiently allocate bands to terminals is described below in the case of transition from the existing radio access system such as E-UTRA to a new radio access system such as IMT-Advanced. For example, embodiments where E-UTRA terminals and IMT-A terminals receive common control information transmitted on the common control channel in the IMT-Advanced system are described below. In addition, embodiments where E-UTRA terminals and IMT-A terminals receive common control information (SU-1 and information other than SU-1) transmitted on the broadcast channel are described below.

<Concept of a Layered Bandwidth Configuration or a Layered OFDMA Configuration>

Figure 1:
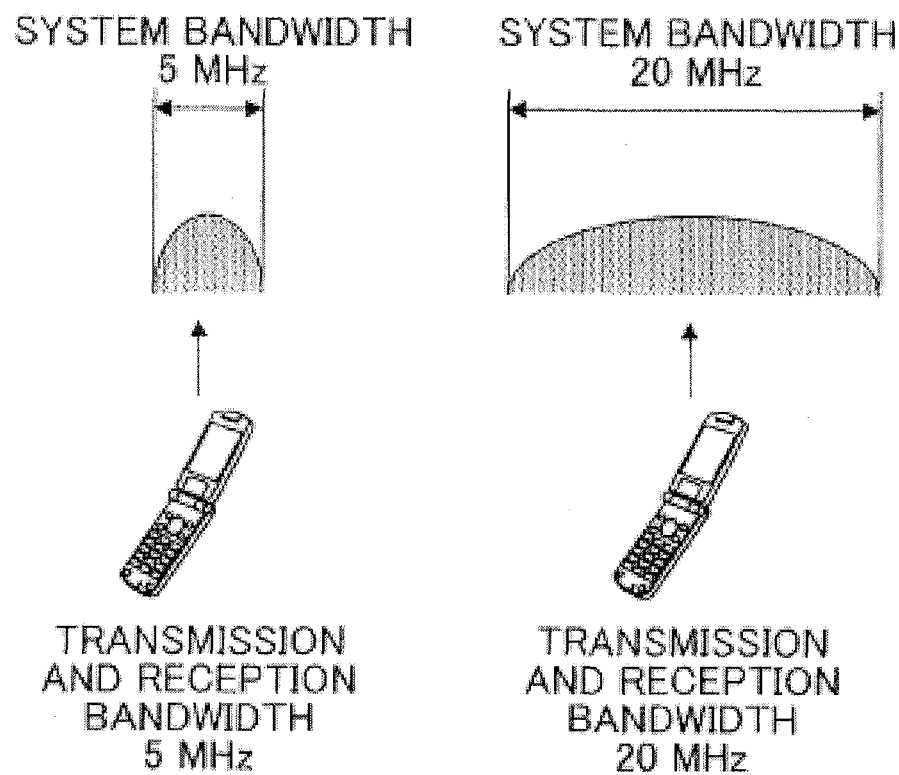
FIG. 1 shows a relationship between a system bandwidth and a transmission and reception bandwidth for E-UTRA.
Figure 2:
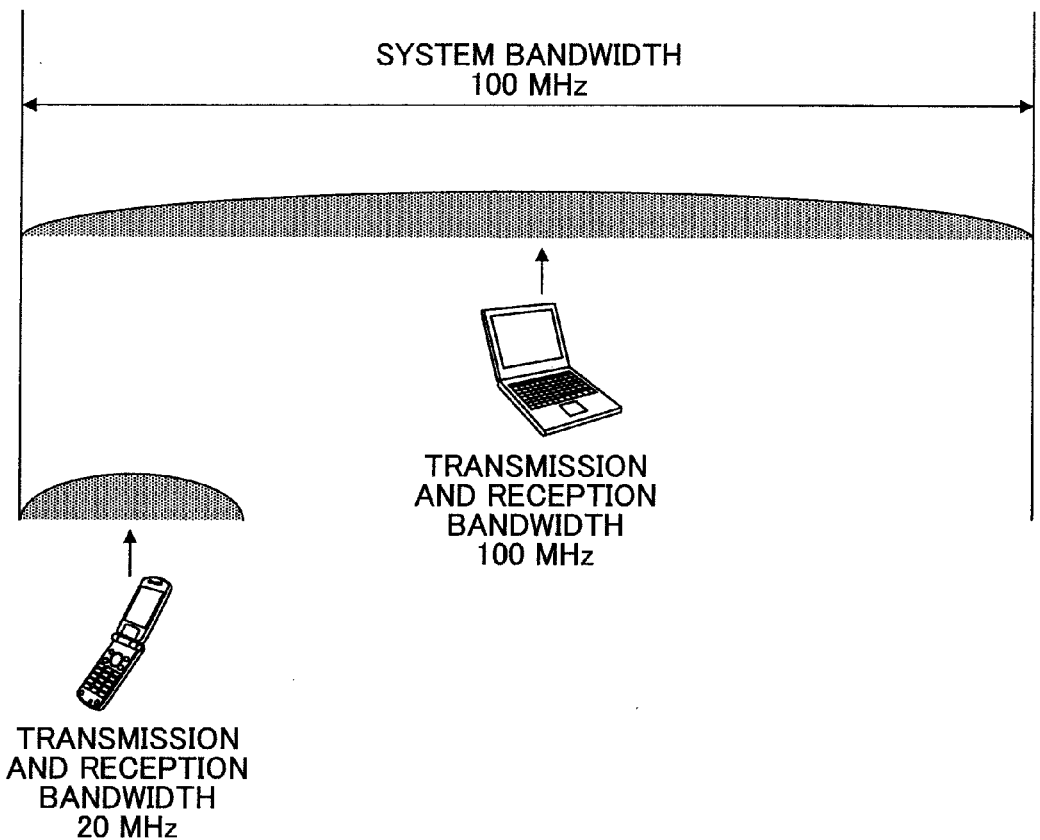
FIG. 2 shows a relationship between a system bandwidth and a transmission and reception bandwidth for a radio access system in accordance with an embodiment of the present invention.
Figure 3:
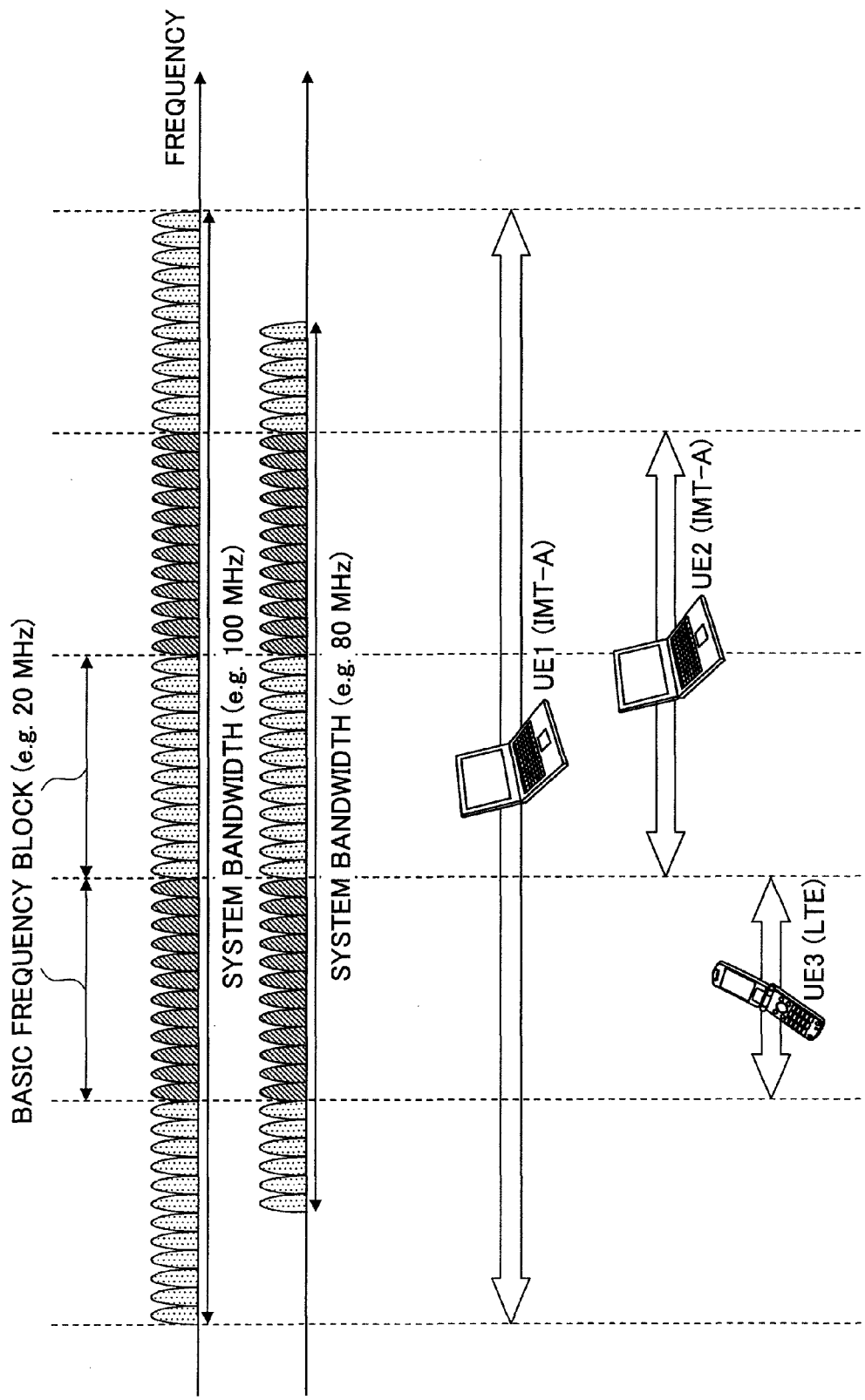
FIG. 3 shows a conceptual diagram of a layered bandwidth configuration in a radio access system in accordance with an embodiment of the present invention.

With reference to FIG. 3, the concept of a bandwidth configuration (layered bandwidth configuration) in a radio access system in accordance with an embodiment of the present invention is described below. It is assumed that requirements for IMT-Advanced are to be satisfied in the radio access system in accordance with the embodiment of the present invention. To provide a wider system bandwidth, it is assumed that the radio access system has the system bandwidth of 100 MHz, for example. In this case, the whole system bandwidth can be divided into five frequency blocks of 20 MHz. The frequency block of 20 MHz corresponding to the maximum transmission and reception bandwidth of the E-UTRA terminal (LTE terminal) is referred to as a basic frequency block (or a frequency block). The bandwidth of the basic frequency block is referred to as a basic bandwidth. In other words, the basic frequency block corresponds to the minimum value of the maximum transmission and reception bandwidths of terminals (also referred to as UE (User Equipment) terminals, mobile stations, or mobile terminals) supported in the radio access system, or equivalently corresponds to the minimum value of the maximum transmission and reception bandwidths of mobile stations with which the base station can accommodate or communicate. In FIG. 3, the center frequency of the center basic frequency block is the same as the center frequency of the system band, since the whole system bandwidth can be divided into an odd number of basic frequency blocks.

When the radio access system has the system bandwidth of 80 MHz, for example, the whole system bandwidth can be divided into four basic frequency blocks. However, as shown in FIG. 3, the whole system bandwidth may be divided into basic frequency blocks, such that the center frequency of the center basic frequency block is the same as the center frequency of the system band. In this case, the whole system bandwidth is formed by plural basic frequency blocks and the remaining subcarriers.

In this manner, by forming a wide system bandwidth using plural basic frequency blocks (and the remaining subcarriers) each of which can be supported in E-UTRA, it is possible to fully support E-UTRA terminals. At the same time, it is possible to support new terminals (IMT-A terminals) which have a wider transmission and reception bandwidth than the E-UTRA system bandwidth (the bandwidth of the basic frequency block), since plural basic frequency blocks (multiple signal bandwidths) can be allocated to the new terminals (IMT-A terminals). In other words, the E-UTRA terminals can communicate using the basic frequency block, which is a portion of the whole system bandwidth. In addition, the IMT-A terminals can communicate using plural basic frequency blocks depending on their UE capabilities. It should be noted that the transmission and reception bandwidth is not necessarily equal to the UE capability. This is because the frequency diversity effect cannot be achieved even though the transmission and reception bandwidth is increased wider than a predetermined value. This is also because overhead of control information to report CQI (channel quality indicator) increases due to the wider transmission and reception bandwidth.

<Exemplary Configurations of a Common Control Channel>

Figure 4:
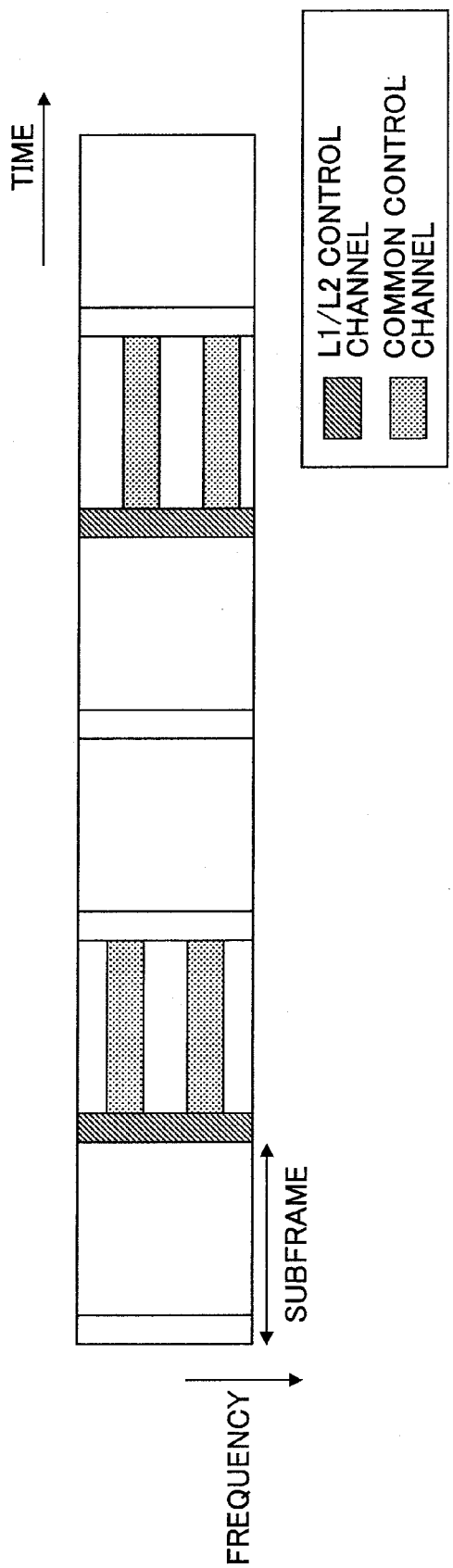
FIG. 4 shows a configuration of a common control channel for LTE.

FIG. 4 shows a configuration of a common control channel for LTE. The common control channel refers to a channel on which the base station transmits common control information to be used in common by plural mobile stations. The common control channel includes a D-BCH (Dynamic Broadcast Channel) and a paging channel, for example.

In LTE, radio resources are divided in the frequency direction and the time direction. A single transmission unit in the time direction is referred to as a subframe or TTI (Transmission Time Interval). The L1/L2 control channel (lower-layer control channel) is included in the first three symbols in the subframe, and the common control channel, the data channel, and so on are included in the remaining symbols in the subframe. L1/L2 control information (lower-layer control information) indicating a radio resource where the common control channel is to be placed is transmitted on the L1/L2 control channel. The L1/L2 control information indicating the radio resource where the common control channel is to be placed is also referred to as Grant. This L1/L2 control information includes a common user ID such that plural users (all users or users in a certain group) within the cell can receive the L1/L2 control information. The mobile station demodulates and decodes the common control channel and the data channel based on the L1/L2 control information.

It should be noted that FIG. 4 shows only the L1/L2 control channel associated with the common control channel, and accordingly the L1/L2 control channel may be included in the other subframes. Similarly, FIGS. 5-11 show only the L1/L2 control channel associated with the common control channel.

As described above, in IMT-Advanced, a wider system bandwidth is required in order to achieve a higher data rate. In addition, in IMT-Advanced, full support of the existing terminals such as LTE terminals is required in consideration of backward compatibility.

With reference to FIGS. 5-11, exemplary configurations of the common control channel to achieve backward compatibility with LTE terminals are described below, in the case where the system bandwidth includes plural frequency blocks (basic frequency blocks) as shown in FIG. 3. As described above, the frequency block corresponds to the minimum value of the maximum transmission and reception bandwidths of mobile stations with which the base station can accommodate or communicate.

Figure 5:
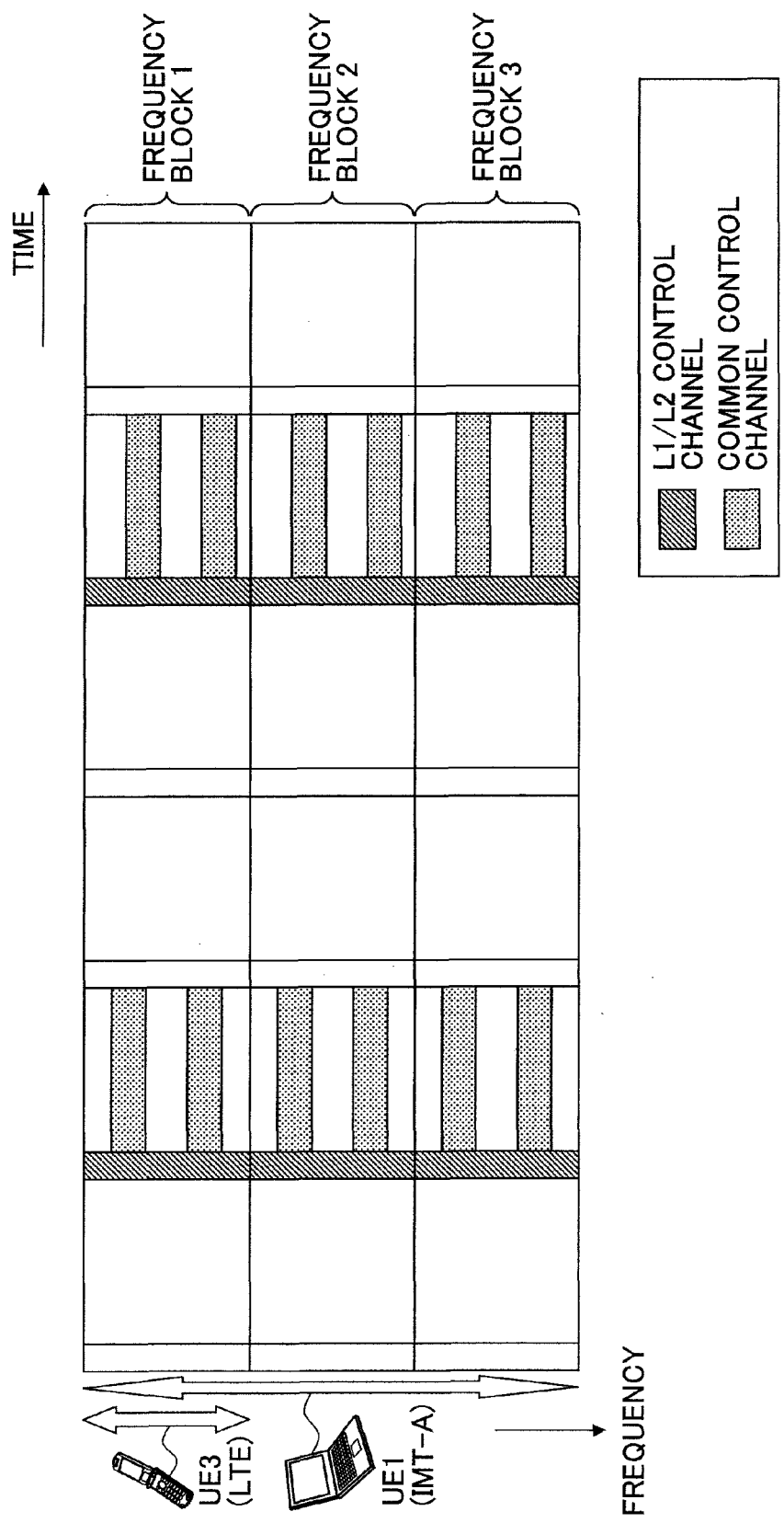
FIG. 5 shows an exemplary configuration of a common control channel in accordance with a first embodiment of the present invention.

FIG. 5 shows an exemplary configuration of a common control channel in accordance with a first embodiment of the present invention. For example, the system bandwidth includes plural frequency blocks 1-3 each having the bandwidth of 20 MHz.

In order to achieve backward compatibility with LTE terminals, the L1/L2 control channel associated with the common control channel needs to be included in the frequency block 1, in which an LTE terminal UE3 can communicate. Similarly, the common control channel needs to be included in the frequency block 1, in which the LTE terminal UE3 can communicate. In the first embodiment, the channel configuration of the frequency block 1 is also applied to the other frequency blocks 2 and 3. Thus, the base station transmits L1/L2 control information in the plural frequency blocks 1-3 included in the system bandwidth, and transmits common control information in the plural frequency blocks 1-3 included in the system bandwidth.

This configuration of the common control channel allows the LTE terminal UE3 to demodulate and decode common control information transmitted on the common control channel upon receiving L1/L2 control information (Grant). This configuration of the common control channel also allows an IMT-A terminal UE1 having a wide-band capability to demodulate and decode common control information transmitted on the common control channel upon receiving L1/L2 control information (Grant). In addition, the IMT-A terminal UE1 can improve reception quality by combining L1/L2 common information or common control information received in the plural frequency blocks 1-3 (frequency diversity reception). When the L1/L2 common information or the common control information is spread with different spreading processes depending on the frequency blocks, reception quality can be further improved. Spreading information with different spreading processes includes spreading information with different spreading factors, spreading information with different spreading codes, and spreading information with different portions of the same spreading code. Further, spreading includes spreading with the spreading factor of 1 (one). When the spreading factor is 1 (one), the sequence to be spread may be merely randomized. The same applies to despreading.

Figure 6:
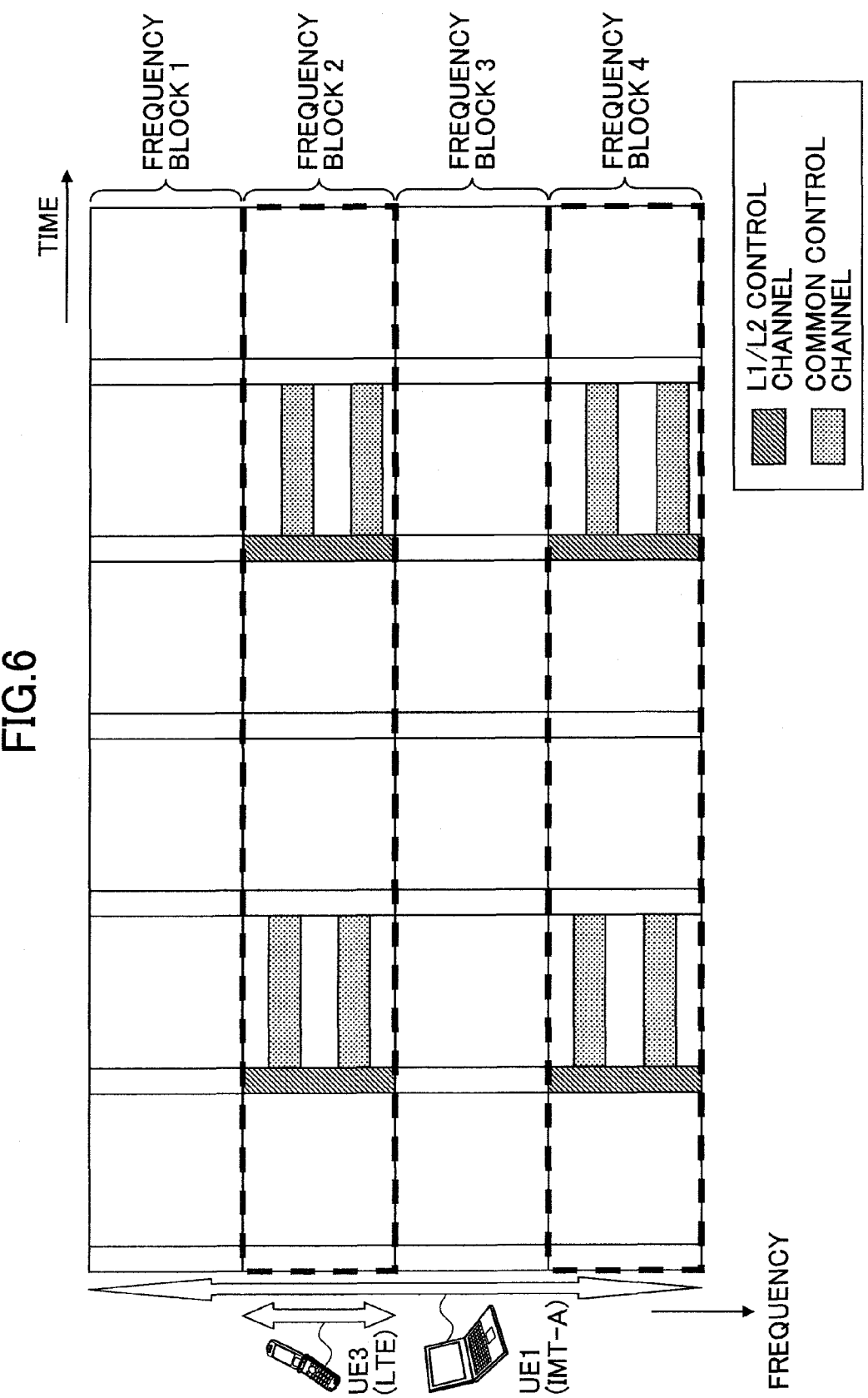
FIG. 6 shows an exemplary configuration of a common control channel in accordance with a second embodiment of the present invention.

FIG. 6 shows an exemplary configuration of a common control channel in accordance with a second embodiment of the present invention. For example, the system bandwidth includes plural frequency blocks 1-4 each having the bandwidth of 20 MHz.

In order to achieve backward compatibility with LTE terminals, the L1/L2 control channel associated with the common control channel needs to be included in the frequency block 2, in which an LTE terminal UE3 can communicate. Similarly, the common control channel needs to be included in the frequency block 2, in which the LTE terminal UE3 can communicate. In the second embodiment, the channel configuration of the frequency block 2 is applied to a certain frequency block 4. Thus, the base station transmits L1/L2 control information in the certain frequency blocks 2 and 4 among the plural frequency blocks 1-4 included in the system bandwidth, and transmits common control information in the certain frequency blocks 2 and 4. The number of certain frequency blocks in which L1/L2 control information and common control information are transmitted may be equal to one or more.

This configuration of the common control channel allows the LTE terminal UE3 to demodulate and decode common control information transmitted on the common control channel upon receiving L1/L2 control information (Grant). This configuration of the common control channel also allows an IMT-A terminal UE1 having a wide-band capability to demodulate and decode common control information transmitted on the common control channel upon receiving L1/L2 control information (Grant). In addition, the IMT-A terminal UE1 can improve reception quality by combining L1/L2 common information or common control information received in the plural frequency blocks 2 and 4 (frequency diversity reception). When the L1/L2 common information or the common control information is spread with different spreading processes depending on the frequency blocks, reception quality can be further improved.

According to the second embodiment, overhead of the L1/L2 control channel and the common control channel can be reduced compared to the first embodiment.

Figure 7:
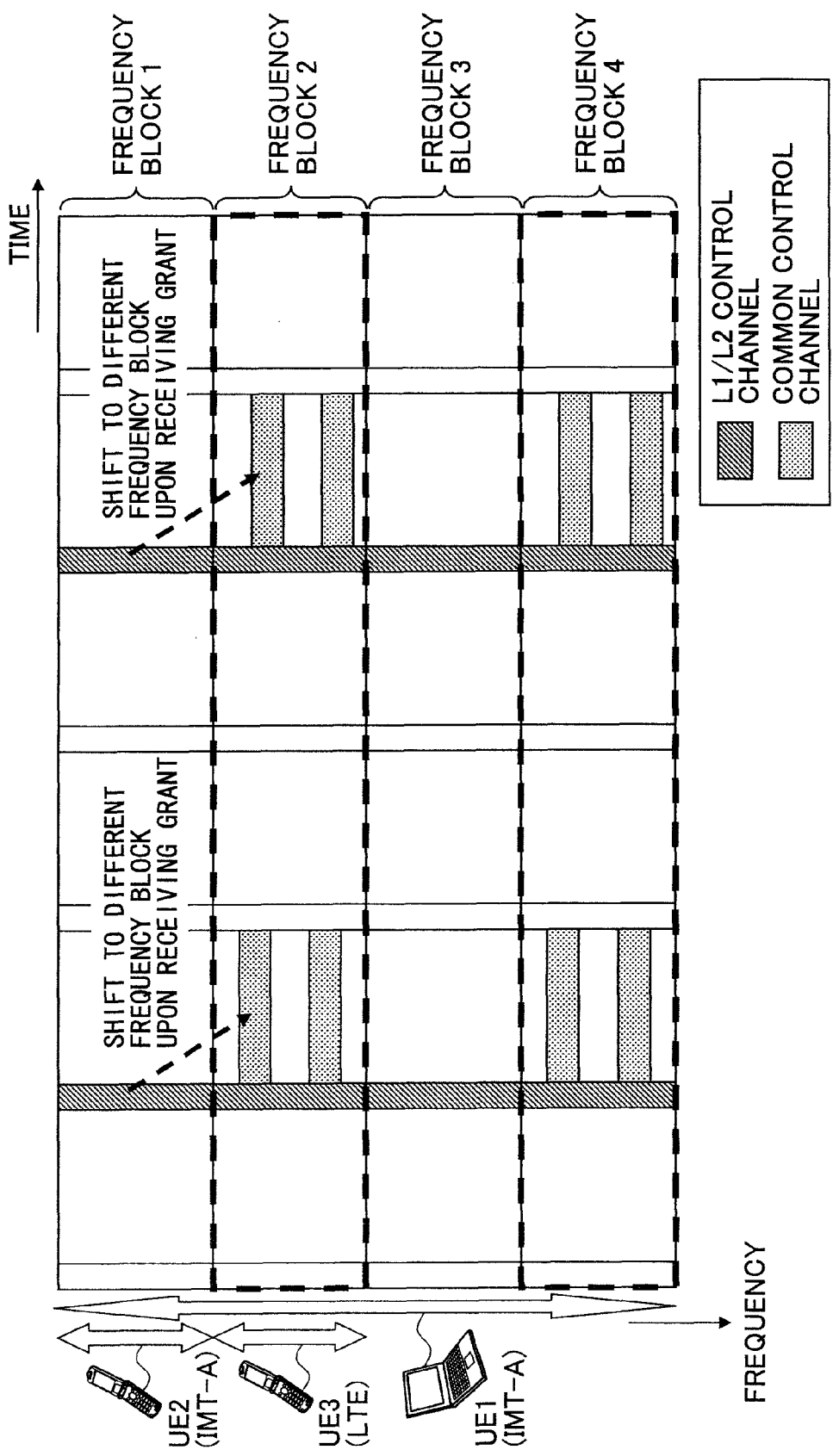
FIG. 7 shows an exemplary configuration of a common control channel in accordance with a third embodiment of the present invention.

FIG. 7 shows an exemplary configuration of a common control channel in accordance with a third embodiment of the present invention. For example, the system bandwidth includes plural frequency blocks 1-4 each having the bandwidth of 20 MHz.

In order to achieve backward compatibility with LTE terminals, the L1/L2 control channel associated with the common control channel needs to be included in the frequency block 2, in which an LTE terminal UE3 can communicate. Similarly, the common control channel needs to be included in the frequency block 2, in which the LTE terminal UE3 can communicate. In the third embodiment, the channel configuration of the frequency block 2 is applied to a certain frequency block 4. In addition, L1/L2 control information indicating a radio resource where the common control channel is to be placed is transmitted in all the frequency blocks 1-4 included in the system bandwidth. Thus, the base station transmits L1/L2 control information in all the frequency blocks 1-4 included in the system bandwidth, and transmits common control information in the certain frequency blocks 2 and 4. The number of certain frequency blocks in which common control information is transmitted may be equal to one or more.

The L1/L2 control information transmitted in the frequency blocks 1 and 3 indicates a radio resource where common control information in the other frequency blocks 2 and 4 is to be placed. Thus, when a terminal UE2 communicating in the frequency block 1 receives L1/L2 control information and finds that common control information is to be transmitted in a different frequency block (a frequency block different from the frequency block in which the L1/L2 control information is transmitted), the terminal UE2 shifts to the different frequency block to receive the common control information.

This configuration of the common control channel allows the LTE terminal UE3 to demodulate and decode common control information transmitted on the common control channel upon receiving L1/L2 control information (Grant). This configuration of the common control channel also allows an IMT-A terminal UE1 having a wide-band capability to demodulate and decode common control information transmitted on the common control channel upon receiving L1/L2 control information (Grant). In addition, the IMT-A terminal UE1 can improve reception quality by combining L1/L2 common information or common control information received in the plural frequency blocks 1-4 (frequency diversity reception). When the L1/L2 common information or the common control information is spread with different spreading processes depending on the frequency blocks, reception quality can be further improved. The IMT-A terminal UE2 having the same bandwidth capability as the LTE terminal can shift to a different frequency block to demodulate and decode common control information upon receiving L1/L2 control information (Grant).

In the second embodiment, the terminal and the base station cannot communicate with each other only using the frequency blocks 1 and 3 without the common control channel. According to the third embodiment, the terminal and the base station can communicate with each other using any frequency block.

Figure 8:
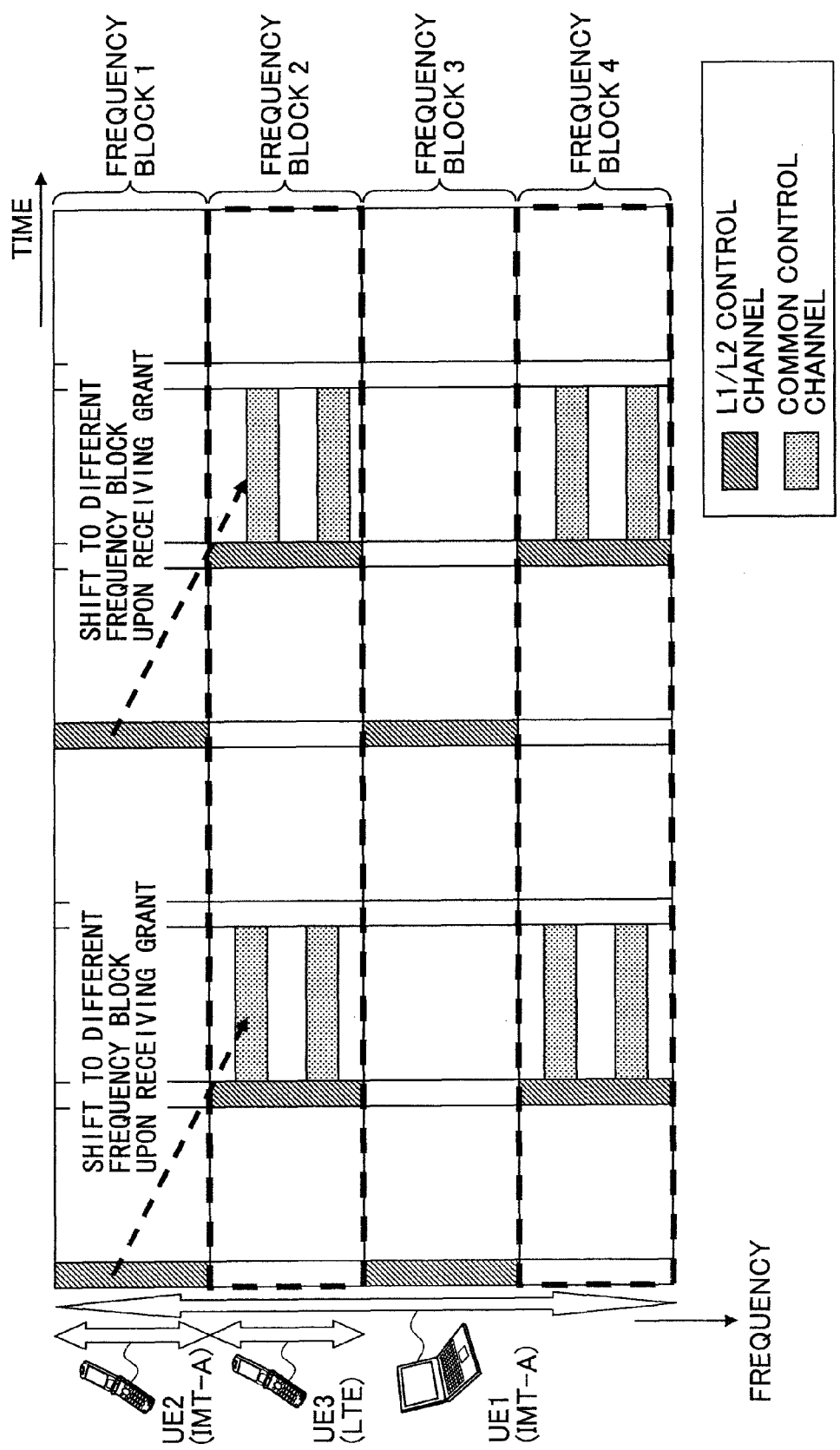
FIG. 8 shows an exemplary configuration of a common control channel in accordance with a fourth embodiment of the present invention.

FIG. 8 shows an exemplary configuration of a common control channel in accordance with a fourth embodiment of the present invention. Compared to the third embodiment (FIG. 7), in the fourth embodiment, common control information is transmitted in a subframe, that is after the subframe in which L1/L2 control information (Grant) is transmitted. (In the fourth embodiment, L1/L2 control information is transmitted first, and then common control information is transmitted in the following subframe.) The time difference between the subframe in which the L1/L2 control information is transmitted and the subframe in which the common control information is transmitted is determined in consideration of the time length needed for the IMT-A terminal UE2, which communicates in the frequency block without the common control information, to shift to a different frequency block.

Figure 9:
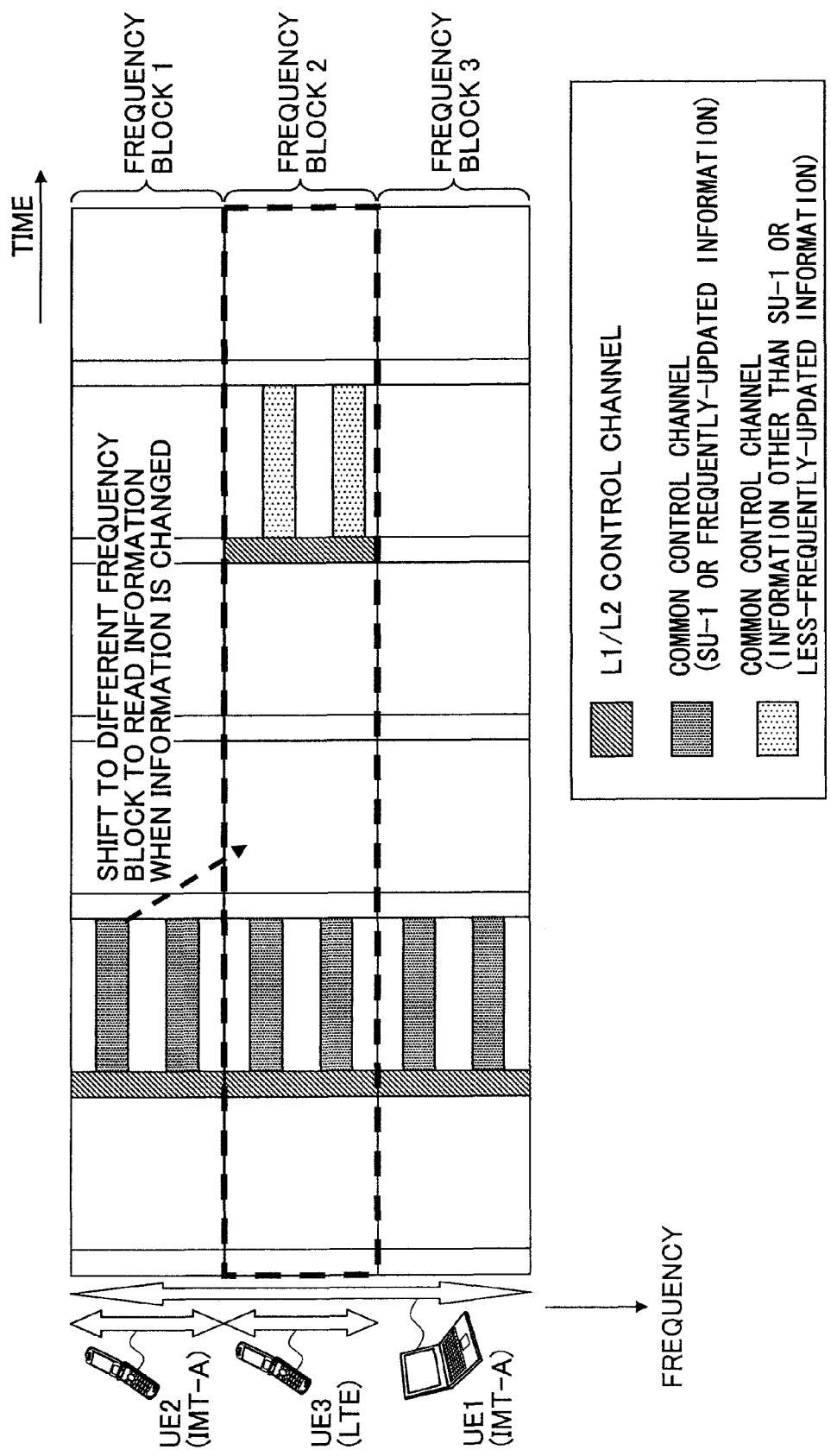
FIG. 9 shows an exemplary configuration of a common control channel in accordance with a fifth embodiment of the present invention.

FIG. 9 shows an exemplary configuration of a common control channel in accordance with a fifth embodiment of the present invention. For example, the system bandwidth includes plural frequency blocks 1-3 each having the bandwidth of 20 MHz. Information transmitted on the D-BCH (Dynamic Broadcast Channel), which is a kind of the common control channel, can be categorized into information (SU-1) indicating that information on the broadcast channel is changed and other information (SU-2, etc.). When the mobile station receives SU-1 and finds that information on the broadcast channel is changed, the mobile station receives information other than SU-1 on the broadcast channel. When the mobile station receives SU-1 and finds that information on the broadcast channel is the same, the mobile station need not receive information (SU-2, etc.) other than SU-1.

In order to achieve backward compatibility with LTE terminals, the L1/L2 control channel associated with SU-1 needs to be included in the frequency block 2, in which an LTE terminal UE3 can communicate. Similarly, the D-BCH containing SU-1 needs to be included in the frequency block 2, in which the LTE terminal UE3 can communicate. In addition, the D-BCH containing information other than SU-1 needs to be included in the frequency block 2, in which the LTE terminal UE3 can communicate. In the fifth embodiment, the channel configuration of the L1/L2 control channel and the common control channel associated with SU-1 is also applied to the other frequency blocks 1 and 3. SU-1 transmitted in the frequency blocks 1 and 3 indicates that information (SU-2, etc.) other than SU-1 is to be transmitted in the frequency block 2. The information other than SU-1 is transmitted only in a certain frequency block 2. Thus, the base station transmits SU-1 and L1/L2 control information associated with SU-1 in all the frequency blocks 1-3 included in the system bandwidth. On the other hand, the base station transmits information (SU-2, etc.) other than SU-1 and L1/L2 control information associated with information other, than SU-1 in the certain frequency block 2 among the frequency blocks 1-3 included in the system bandwidth. The number of certain frequency blocks in which information other than SU-1 is transmitted may be equal to one or more.

This configuration of the common control channel allows the LTE terminal UE3 to demodulate and decode SU-1 upon receiving L1/L2 control information (Grant) associated with SU-1. In addition, after demodulating and decoding SU-1, the LTE terminal UE3 can demodulate and decode information other than SU-1, if needed. This configuration of the common control channel also allows an IMT-A terminal UE1 having a wide-band capability to demodulate and decode SU-1 upon receiving L1/L2 control information (Grant) associated with SU-1. In addition, after demodulating and decoding SU-1, the IMT-A terminal UE1 can demodulate and decode information other than SU-1, if needed. Furthermore, the IMT-A terminal UE1 can improve reception quality by combining SU-1 or L1/L2 common information associated with SU-1 received in the plural frequency blocks 1-3 (frequency diversity reception). When the SU-1 or the L1/L2 common information is spread with different spreading processes depending on the frequency blocks, reception quality can be further improved.

An IMT-A terminal UE2 having the same bandwidth capability as the LTE terminal can also demodulate and decode SU-1 upon receiving L1/L2 control information (Grant) associated with SU-1. If the IMT-A terminal UE2 needs to receive information other than SU-1 after demodulating and decoding SU-1, the IMT-A terminal UE2 can shift to a different frequency block. After shifting to the different frequency block, the IMT-A terminal UE2 can demodulate and decode information other than SU-1 according to a radio resource specified by L1/L2 control information associated with information other than SU-1.

Figure 10:
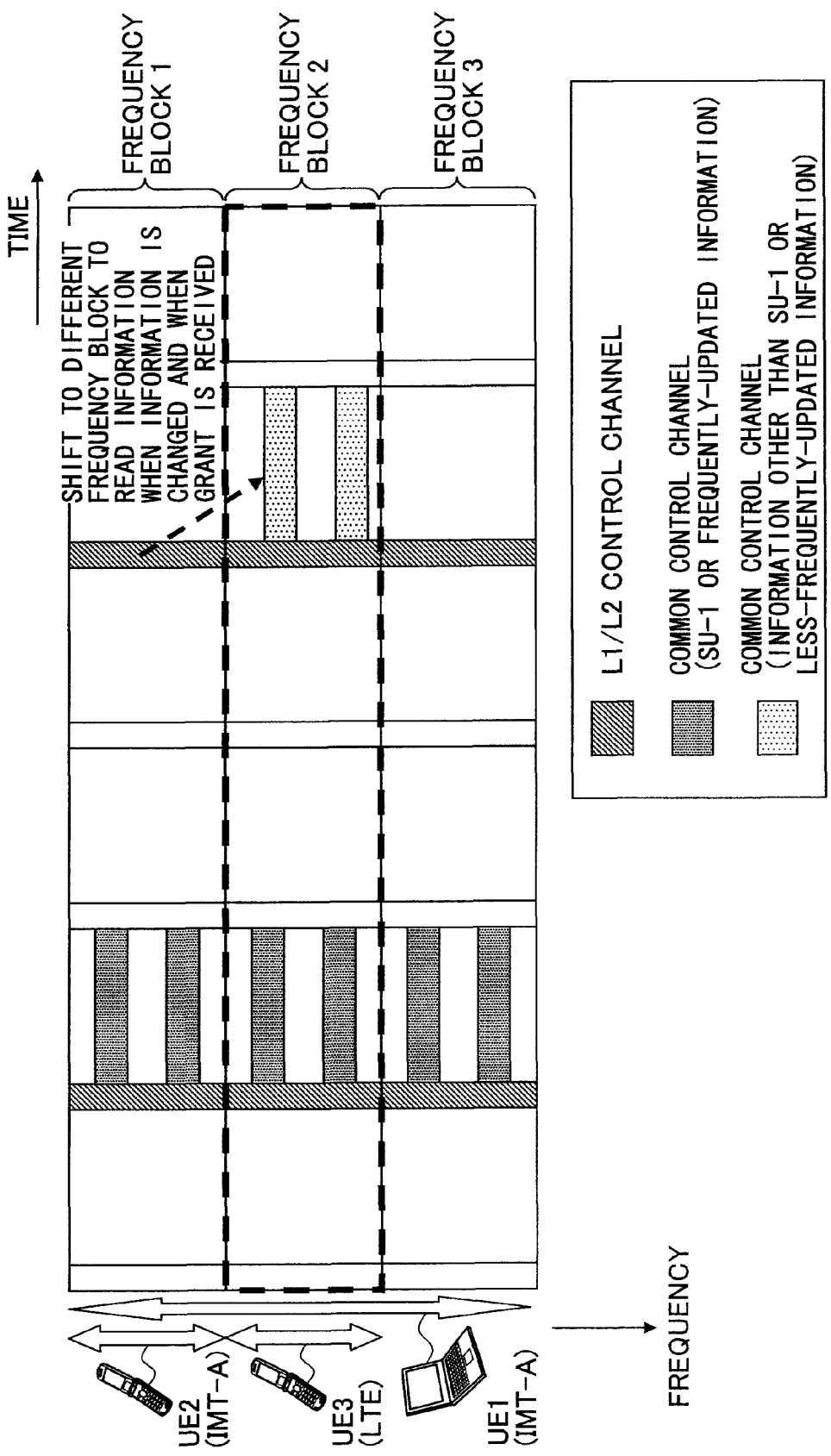
FIG. 10 shows an exemplary configuration of a common control channel in accordance with a sixth embodiment of the present invention.

FIG. 10 shows an exemplary configuration of a common control channel in accordance with a sixth embodiment of the present invention. Compared to the fifth embodiment (FIG. 9), in the sixth embodiment, L1/L2 control information (Grant) associated with information other than SU-1 is transmitted in all the frequency blocks 1-3 included in the system bandwidth. In this case, information about the frequency block 2 in which information other than SU-1 is transmitted may be specified by L1/L2 control information associated with information other than SU-1, rather than by SU-1.

This configuration of the common control channel allows an IMT-A terminal UE2 having the same bandwidth capability as the LTE terminal to demodulate and decode SU-1 upon receiving L1/L2 control information (Grant) associated with SU-1. If the IMT-A terminal UE2 needs to receive information other than SU-1 after demodulating and decoding SU-1, the IMT-A terminal UE2 demodulates and decodes L1/L2 control information (Grant) associated with information other than SU-1 in the same frequency block. Then, the IMT-A terminal UE2 shifts to a different frequency block according to a radio resource specified by L1/L2 control information associated with information other than SU-1, and then demodulates and decodes information other than SU-1.

While the fifth embodiment and sixth embodiment focus on SU-1 and information other than SU-1 in the D-BCH, the present invention is also applicable to the case where frequently-updated information and less-frequently-updated information are transmitted on the common control channel.

In addition, the fifth embodiment or the sixth embodiment may be combined with any of the first through fourth embodiments.

For example, the base station may transmit SU-1 and L1/L2 control information associated with SU-1 in a certain frequency block, as described in the second embodiment, rather than in all the frequency blocks. Alternatively, the base station may transmit L1/L2 control information associated with SU-1 in all the frequency blocks and transmit SU-1 in a certain frequency block, as described in the third embodiment. In addition, the subframe in which SU-1 is transmitted may be delayed from the subframe in which L1/L2 control information associated with SU-1 is transmitted, as described in the fourth embodiment.

Similarly, as to SU-2, the fifth embodiment or the sixth embodiment may be combined with any of the first through fourth embodiments. For example, the base station may transmit L1/L2 control information associated with SU-2 in a certain frequency block, as described in the second embodiment, rather than in all the frequency blocks as described in the sixth embodiment. In addition, the subframe in which SU-2 is transmitted may be delayed from the subframe in which L1/L2 control information associated with SU-2 is transmitted, as described in the fourth embodiment.

Figure 11:
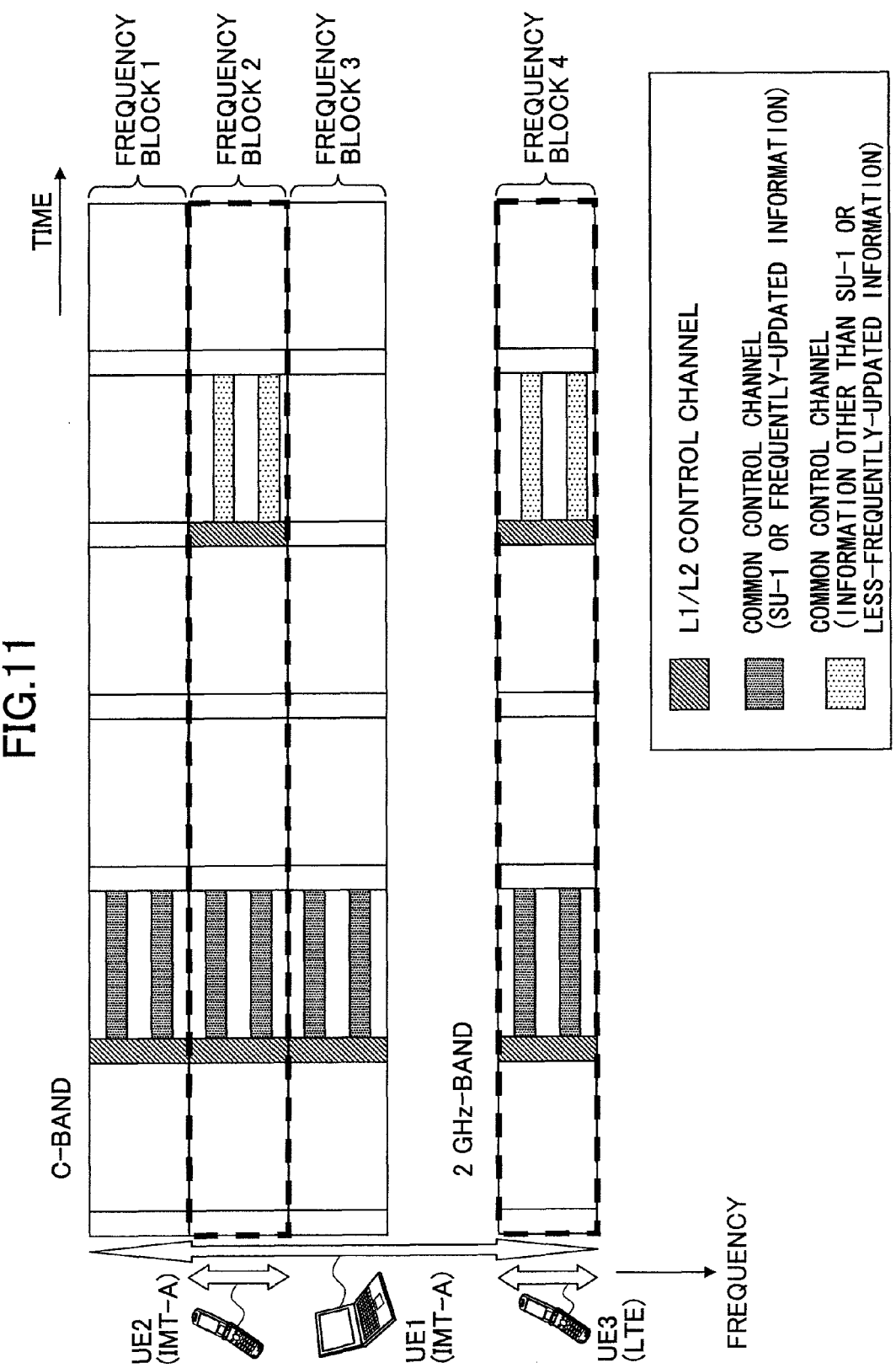
FIG. 11 shows an exemplary configuration of a common control channel in the case of frequency aggregation.

In the first through sixth embodiments, the system band is continuous. Alternatively, these embodiments are also applicable to the case of frequency aggregation (spectrum aggregation), in which the system band is configured with the 2 GHz band and the C-band, for example, and thus the system band is discontinuous. As an example, FIG. 11 shows an example to which the fifth embodiment is applied in the case of frequency aggregation.

<Configuration of a Base Station>

Figure 12:
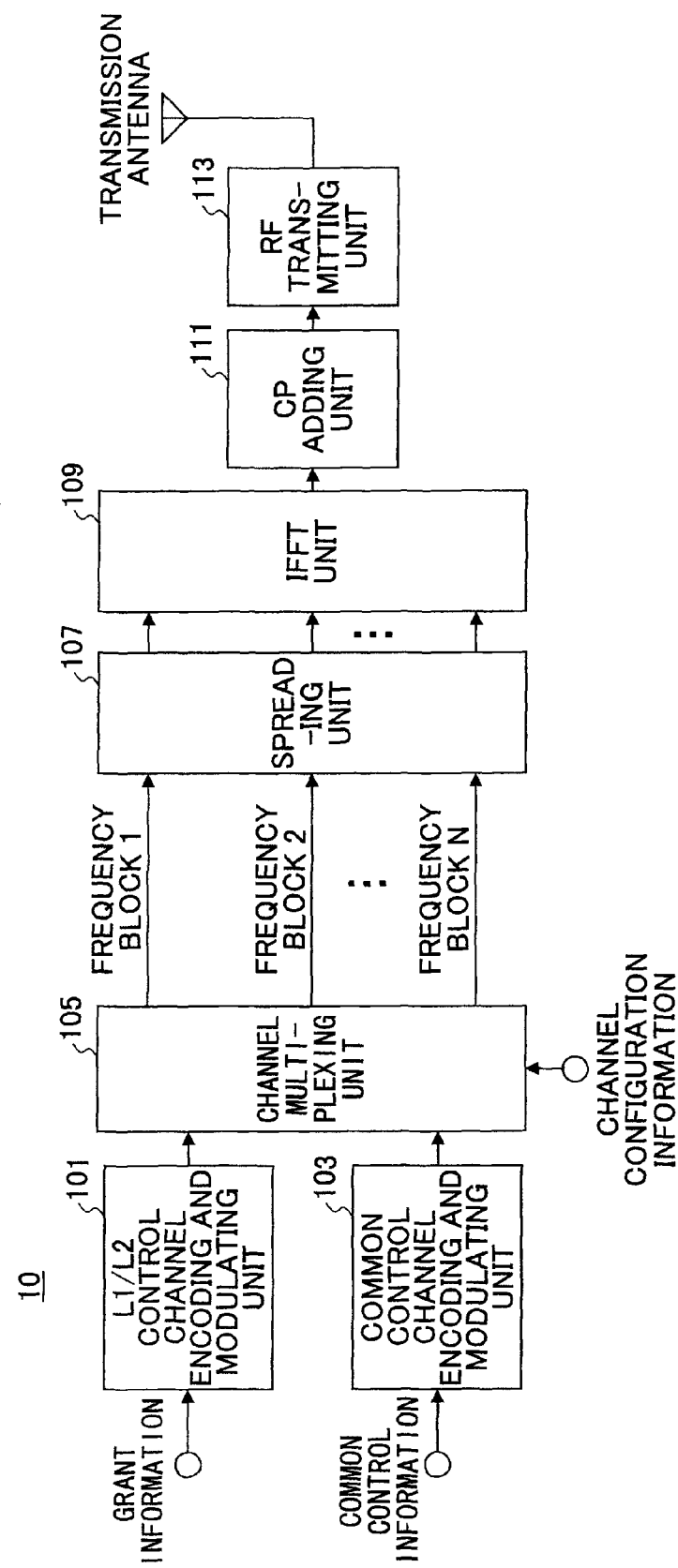
FIG. 12 shows a block diagram of a base station in accordance with an embodiment of the present invention.

With reference to FIG. 12, the configuration of a base station 10 in accordance with any of the first through sixth embodiments is described below.

The base station 10 includes an L1/L2 control channel encoding and modulating unit 101 as a lower-layer control information generating unit, a common control channel encoding and modulating unit 103 as a common information generating unit, a channel multiplexing unit 105, a spreading unit 107, an IFFT unit 109, a CP adding unit 111, and an RF transmitting unit 113.

The L1/L2 control channel encoding and modulating unit 101 encodes and modulates L1/L2 control information (Grant). The L1/L2 control information indicates a radio resource where common control information to be transmitted on the common control channel is to be placed. As described in the third embodiment, the L1/L2 control information may indicate a radio resource where common control information to be transmitted in a different frequency block is to be placed.

The common control channel encoding and modulating unit 103 encodes and modulates common control information to be transmitted on the common control channel. For example, the common control information includes broadcast information (SU-1, SU-2, etc.) to be transmitted on the D-BCH and a paging message to be transmitted on the paging channel.

The channel multiplexing unit 105 multiplexes the L1/L2 control channel and the common control channel according to channel configuration information as shown in FIGS. 5-11. In the first embodiment, the channel multiplexing unit 105 multiplexes the L1/L2 control channel and the common control channel into plural frequency blocks included in the system bandwidth. In the second embodiment, the channel multiplexing unit 105 multiplexes the L1/L2 control channel and the common control channel into a certain frequency block among plural frequency blocks included in the system bandwidth. In the third embodiment, the channel multiplexing unit 105 multiplexes the L1/L2 control channel into all the frequency blocks included in the system bandwidth and multiplexes the common control channel into a certain frequency block. In the fourth embodiment, the channel multiplexing unit 105 multiplexes the common control channel into a subframe, that is after the subframe into which the L1/L2 control channel is multiplexed.

In the fifth embodiment, the channel multiplexing unit 105 multiplexes the D-BCH and the L1/L2 control channel associated with SU-1 into all the frequency blocks included in the system bandwidth. In addition, the channel multiplexing unit 105 multiplexes the D-BCH and the L1/L2 control channel associated with information other than SU-1 into a certain frequency block. In the sixth embodiment, the channel multiplexing unit 105 multiplexes the D-BCH and the L1/L2 control channel associated with SU-1 into all the frequency blocks included in the system bandwidth. In addition, the channel multiplexing unit 105 multiplexes the L1/L2 control channel associated with information other than SU-1 into all the frequency blocks and multiplexes the D-BCH associated with information other than SU-1 into a certain frequency block.

The spreading unit spreads the multiplexed L1/L2 control information and common control information with different spreading processes depending on the frequency blocks. Then, IFFT unit 109 performs Inverse Fast Fourier Transform of the spread L1/L2 control information and common control information to convert the information into the time domain. In addition, the CP adding unit 111 adds a guard interval (CP: Cyclic Prefix) to the information, which is transmitted from the RF transmitting unit 113 as downlink signals.

<Configuration of a Mobile Station>

Figure 13:
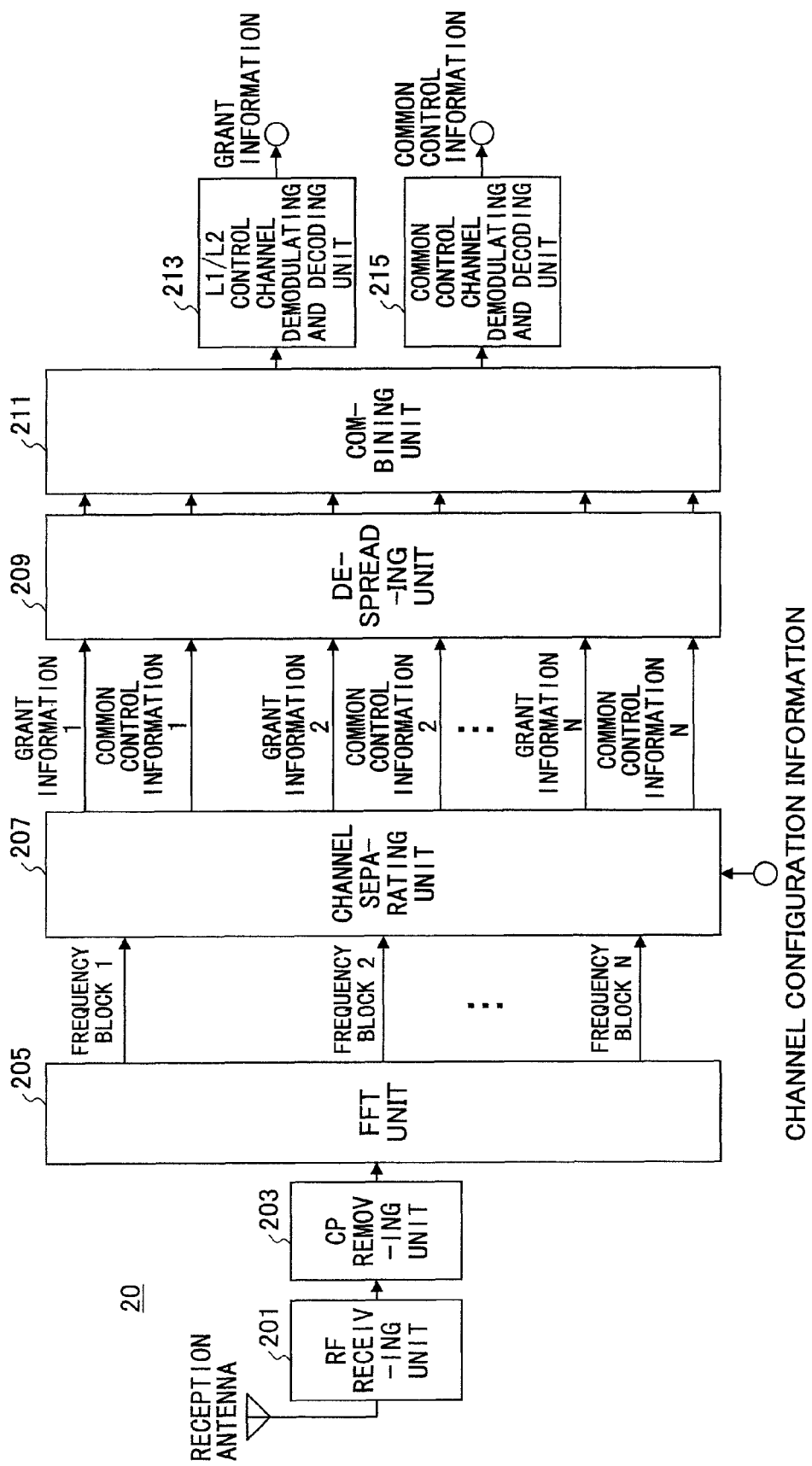
FIG. 13 shows a block diagram of a mobile station in accordance with an embodiment of the present invention (in the case of a wide-band capability).

With reference to FIG. 13, the configuration of a mobile station 20 in accordance with any of the first through sixth embodiments is described below. It is assumed that the mobile station 20 has a wide-band capability to communicate using plural frequency blocks.

The mobile station 20 includes an RF receiving unit 201, a CP removing unit 203, an FFT unit 205, a channel separating unit 207, a de-spreading unit 209, a combining unit 211, an L1/L2 control channel demodulating and decoding unit 213 as a lower-layer control information receiving unit, and a common control channel demodulating and decoding unit 215 as a common information receiving unit.

The CP removing unit 203 removes a guard interval (CP: Cyclic Prefix) from downlink signals received by the RF receiving unit 201. Then, the FFT unit 205 performs Fast Fourier Transform to convert the signals into the frequency domain. According to channel configuration information as shown in FIGS. 5-11, the channel separating unit 207 separates L1/L2 control information (Grant) and common control information for each frequency block from the downlink signals converted into the frequency domain. When the L1/L2 control information and the common control information are multiplexed into plural frequency blocks and are spread with different spreading processes depending on the frequency blocks, the L1/L2 control information and the common control information are de-spread by the de-spreading unit 209 and are combined by the combining unit 211.

The L1/L2 control channel demodulating and decoding unit 213 demodulates and decodes the de-spread and combined L1/L2 control information.

The common control channel demodulating and decoding unit 215 demodulates and decodes the common control information according to the radio resource specified by the L1/L2 control information.

Figure 14:
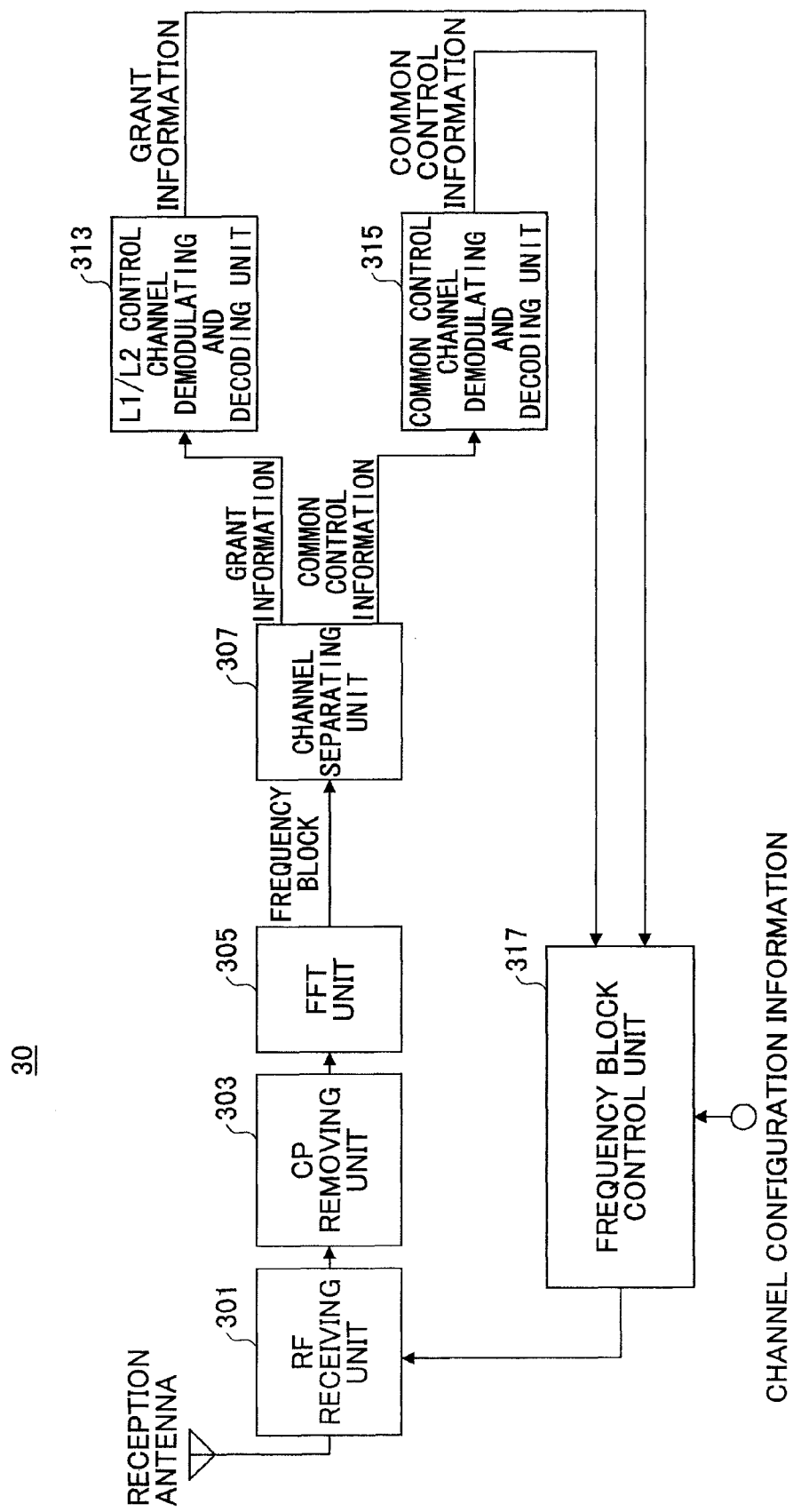
FIG. 14 shows a block diagram of a mobile station in accordance with an embodiment of the present invention (in the case of a narrow band capability).

With reference to FIG. 14, the configuration of a mobile station 30 in accordance with any of the first through sixth embodiments is described below. It is assumed that the mobile station 30 has the same bandwidth capability (narrow-band capability) as the LTE terminal.

The mobile station 30 includes an RF receiving unit 301, a CP removing unit 303, an FFT unit 305, a channel separating unit 307, an L1/L2 control channel demodulating and decoding unit 313 as a lower-layer control information receiving unit, a common control channel demodulating and decoding unit 315 as a common information receiving unit, and a frequency block control unit 317.

The frequency control unit 317 specifies the frequency block to receive downlink signals, and accordingly the RF receiving unit 301 receives the downlink signals in the specified frequency block. The CP removing unit 303 removes a guard interval (CP: Cyclic Prefix) from the downlink signals received by the RF receiving unit 301. Then, the FFT unit 305 performs Fast Fourier Transform to convert the signals into the frequency domain. The channel separating unit 307 separates L1/L2 control information (Grant) and common control information from the downlink signals converted into the frequency domain.

The L1/L2 control channel demodulating and decoding unit 313 demodulates and decodes the L1/L2 control information. When the demodulated and decoded L1/L2 control information indicates that common control information is to be transmitted in a different frequency block, radio resource information of the different frequency block is supplied to the frequency block control unit 317.

The common control channel demodulating and decoding unit 315 demodulates and decodes the common control information based on the radio resource specified by the L1/L2 control information. When SU-1 information among the demodulated and decoded common control information indicates that information other than SU-1 is to be transmitted in a different frequency block, information about the different frequency block is supplied to the frequency block control unit 317. When the received SU-1 indicates that information on the broadcast channel is changed, the common control channel demodulating and decoding unit 315 receives information (SU-2, etc.) other than SU-1 with the frequency block specified by the L1/L2 control information or SU-1.

The frequency block control unit 317 changes a radio resource to receive signals based on L1/L2 control information, SU-1, and channel configuration information as shown in FIGS. 5-11. For example, the frequency block control unit 317 shifts to the frequency block specified by the L1/L2 control information to receive signals. In addition, the frequency block control unit 317 shifts to the frequency block specified by the L1/L2 control information or SU-1 to receive SU-2.

<Common Control Information Communicating Method>

Figure 15:
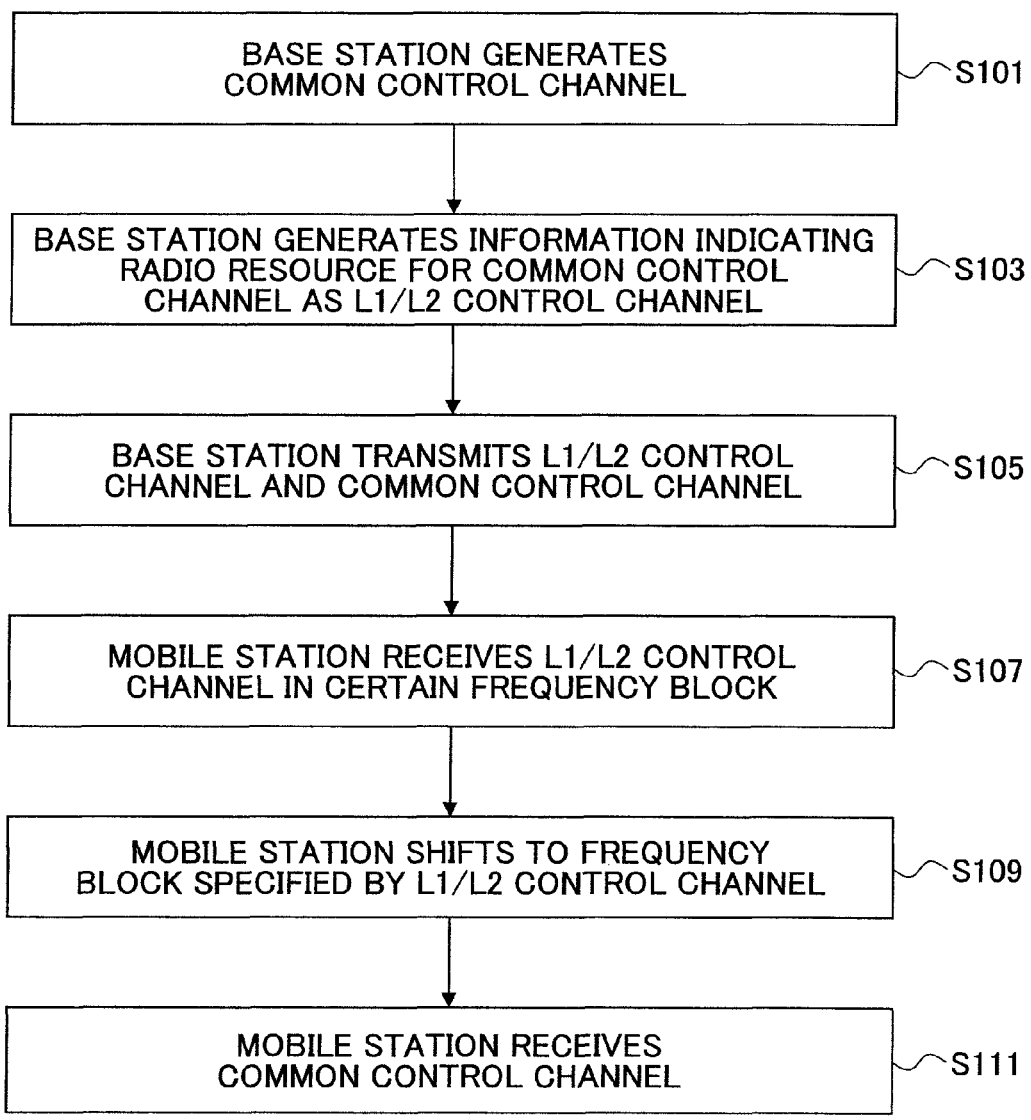
FIG. 15 shows a flowchart of a common control information communicating method in accordance with an embodiment of the present invention.

With reference to FIG. 15, a common control information communicating method in accordance with any of the first through sixth embodiments is described below.

First, the base station generates a common control channel to transmit common control information which is used in common by plural mobile stations (S101). Then, the base station generates, as an L1/L2 control channel, information indicating a radio resource where the common control channel is to be placed (S103). Then, the base station multiplexes and transmits the L1/L2 control channel and the common control channel according to channel configuration information as shown in FIGS. 5-11.

The mobile station receives L1/L2 control information on the L1/L2 control channel in a certain frequency block according to channel configuration information shown in FIGS. 5-11. When the mobile station receives the L1/L2 control information in plural frequency blocks, the mobile station may combine the L1/L2 control information. When the radio resource specified by the L1/L2 control information is included in a different frequency block, the mobile station shifts to the different frequency block (S109). Then, the mobile station receives common control information on the common control channel according to the radio resource specified by the L1/L2 control information (S111). When the mobile station receives the common control information in plural frequency blocks, the mobile station may combine the common control information.

When the mobile station receives SU-1 in the common control information and the SU-1 indicates that information other than SU-1 is to be transmitted in a different frequency block, the mobile station shifts to the different frequency block in the same manner as in step S109 to receive information other than SU-1. In this case, the mobile station receives L1/L2 control information in the different frequency block and then receives information other than SU-1 according to the radio resource specified by the L1/L2 control information.

According to an embodiment of the present invention, as to common information which is used in common by plural mobile stations, the base station can support both the existing terminals such as E-UTRA terminals and new terminals such as IMT-A terminals all together. In addition, the base station can efficiently allocate bands to these terminals.

While these embodiments focus on exemplary configurations of the common control channel, the present invention is also applicable to any common information such as broadcast information or multicast information which is used in common by plural mobile stations, in addition to common control information to be transmitted on the common control channel.

In the embodiments of the present invention, migration from the existing radio access system such as the E-UTRA system to a new radio access system such as the IMT-Advanced system is taken as an example. However, the present invention is not limited to these embodiments, but can be applied to any radio access system in which full support of the existing terminals and a wider bandwidth are required.

DESCRIPTION OF NOTATIONS 10 base station
101 L1/L2 control channel encoding and modulating unit
103 common control channel encoding and modulating unit
105 channel multiplexing unit
107 spreading unit
109 IFFT unit
111 CP adding unit
113 RF transmitting unit
20 mobile station
201 RF receiving unit
203 CP removing unit
205 FFT unit
207 channel separating unit
209 de-spreading unit
211 combining unit
213 L1/L2 control channel demodulating and decoding unit
215 common control channel demodulating and decoding unit
30 mobile station
301 RF receiving unit
303 CP removing unit
305 FFT unit
307 channel separating unit
313 L1/L2 control channel demodulating and decoding unit
315 common control channel demodulating and decoding unit
317 frequency block control unit

The invention claimed is:

1. A base station for transmitting both common information which is used in common by plural mobile stations and control information indicating that the common information is changed, comprising:
   a common information generating unit configured to generate the control information and the common information;
   a lower-layer control information generating unit configured to generate first lower-layer control information indicating a radio resource where the control information is to be placed and second lower-layer control information indicating a radio resource where the common information is to be placed;
   a multiplexing unit configured to multiplex the first lower-layer control information and the control information into a plurality of frequency blocks included within a system bandwidth and multiplex the second lower-layer control information and the common information into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations; and
   a transmitting unit configured to transmit the multiplexed first lower-layer control information, control information, second lower-layer control infoimation, and common information.

2. The base station as claimed in claim 1, further comprising:
   a spreading unit configured to spread the first lower-layer control information, the second lower-layer control information, the control information, and the common information with different spreading processes depending on the frequency blocks.

3. The base station as claimed in claim 1, wherein:
   the multiplexing unit multiplexes the second lower-layer control information and the common information into different frequency blocks.

4. The base station as claimed in claim 3, wherein:
   the multiplexing unit multiplexes the second lower-layer control information into a first subframe and multiplexes the common information into a second subframe after the first subframe.

5. The base station as claimed in claim 1, wherein:
   the control information includes frequently-updated infonuation.

6. A mobile station for receiving from a base station both common information which is used in common by plural mobile stations and control information indicating that the common information is changed, comprising:

a lower-layer control information receiving unit configured to receive first lower-layer control information which is multiplexed into a plurality of frequency blocks included within a system bandwidth and second lower-layer control information which is multiplexed into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations; and a common information receiving unit configured to receive the control information based on the first lower-layer control information and receive the common information based on the control information and the second lower-layer control information.

7. The mobile station as claimed in claim 6, further comprising:

a de-spreading unit configured to de-spread the first lower-layer control infoimation, the second lower-layer control information, the control information, and the common information, which are received in different frequency blocks, with different de-spreading processes; and a combining unit configured to combine the first lower-layer control information, the second lower-layer control information, the control information, and the common information, which are received in different frequency blocks, with different de-spreading processes.

8. A mobile station for receiving from a base station both common information which is used in common by plural mobile stations and control information indicating that the common information is changed, comprising:

a lower-layer control information receiving unit configured to receive lower-layer control information;

a control information receiving unit configured to receive the control information based on the lower-layer control information;

a radio resource control unit configured to change a radio resource to receive the common information based on the lower-layer control information and the control information; and a common information receiving unit configured to receive the common information with the changed radio resource.

9. A common information communicating method for transmitting from a base station to a mobile station both common information which is used in common by plural mobile stations and control information indicating that the common information is changed, comprising the steps of:

generating, by the base station, the control information and the common information;

generating, by the base station, first lower-layer control information indicating a radio resource where the control information is to be placed and second lower-layer control information indicating a radio resource where the common information is to be placed;

multiplexing, by the base station, the first lower-layer control information and the control information into a plurality of frequency blocks included within a system bandwidth and multiplex the second lower-layer control information and the common information into one or more frequency blocks among the plurality of frequency blocks included within the system bandwidth, the system bandwidth being divided into the plurality of frequency blocks each corresponding to a minimum value of maximum transmission and reception bandwidths used by the plural mobile stations;

transmitting, by the base station, the multiplexed first lower-layer control information, control information, second lower-layer control information, and common information;

receiving, by the mobile station, the first lower-layer control information;

receiving, by the mobile station, the control information based on the first lower-layer control information; and receiving, by the mobile station, the common information based on the second lower-layer control information and the control information.

* * * * *